(No Model.)

H. C. HOWELL.
CORN AND PEA PLANTER.

No. 332,153.       Patented Dec. 8, 1885.

WITNESSES:
Robert Kirk

INVENTOR:
Henry C. Howell
By
Attorney.

UNITED STATES PATENT OFFICE.

HENRY C. HOWELL, OF BATON ROUGE, LOUISIANA.

CORN AND PEA PLANTER.

SPECIFICATION forming part of Letters Patent No. 332,153, dated December 8, 1885.

Application filed May 29, 1885. Serial No. 167,027. (No model.)

*To all whom it may concern:*

Be it known that I, HENRY C. HOWELL, of Baton Rouge, in the parish of East Baton Rouge and State of Louisiana, have invented a new and Useful Improvement in Corn and Pea Planters, which improvement is fully set forth in the following specification and accompanying drawings, in which—

Figure 1:
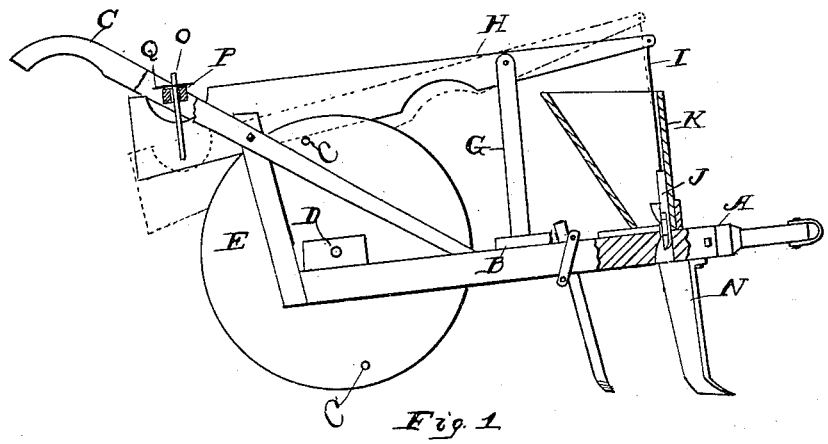
Figure 2:
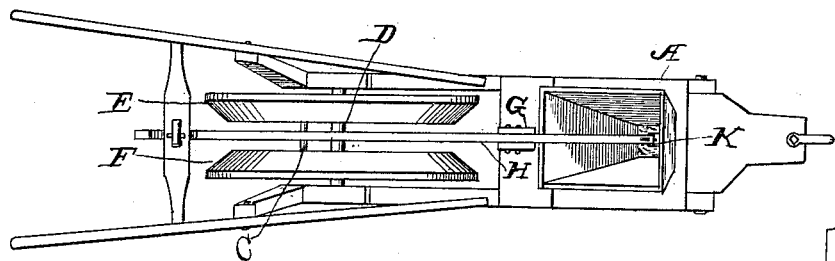
Figure 3:
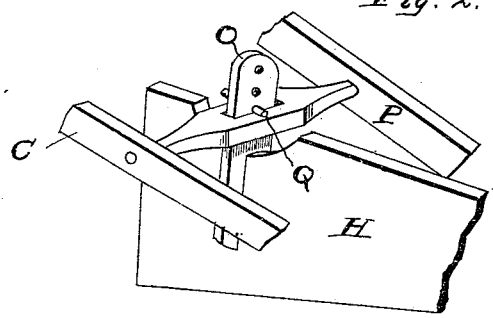

Figure 1 is a side view, partly in section, of my improved corn and pea planter; Fig. 2, a plan view of the same; Fig. 3, an enlarged perspective view of the rear end of the lever connecting with the handles, and Fig. 4 is a perspective view of the dropper.

The present invention relates to an improvement in corn and pea planters, wherein I provide a pair of beveled wheels a short distance apart upon a common axle, connected together by means of bolts or pins designed to operate a rocking lever connecting at its forward end with a dropper, whereby the seed is fed into the furrowing-drill intermediately, and the seed lever and dropper may be stopped or started by connecting the rear end of the lever with the handles rearwardly, all of which will now be set forth in detail.

In the accompanying drawings, A represents the frame of the planter, having suitable transverse connecting-pieces, B, and suitable handles, C. At the rear end of this frame I provide a transverse axle, D, having thereon a pair of wheels, E, of any suitable size, and having the inner ends of their peripheries F formed somewhat beveling. These wheels are designed to be placed a few inches apart rigidly upon the axle, connected by means of fulcrum-pins G some distance outwardly from the axle D. Forward from these wheels E an upright post, G, is placed over the transverse piece B, provided at its upper end with a recess wherein a lever, H, is hinged. Rearwardly this lever H rests between the wheels E, and as the said wheels revolve a rocking motion is produced by engaging with the fulcrum-pins C C. The forward end of this lever has a vertical rod, I, extending to and connecting with the dropper J within the seed-box K.

Figure 4:
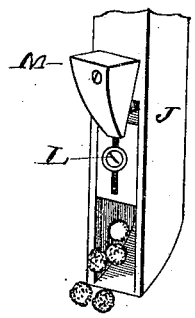

The dropper, as shown in Fig. 4, is provided with an adjustable plate secured by means of a set-screw, L, whereby the quantity of seed discharged from the seed-box may be regulated. Upwardly from this adjustable plate I provide a lug, M, designed to agitate the seed and prevent the seed from becoming choked up around the dropper in its passage into the furrowing-drill beneath.

When it is desired to stop the operation of the dropper, I do so by raising the rear end of the rocking lever H sufficiently to prevent its engaging with the fulcrum-lugs C between the wheels, and to secure it in position by means of a pin passing through the vertical pin-holes O, housed within a transverse piece, P, between the handles, and with its lower end embracing and hinged to the said lever. When the rocking lever is in operation, this pin Q may be removed, thus permitting the vertical pins O to play freely vertically within the transverse piece P.

As will be noticed, the lever H, by the revolution of the wheels E, engages intermediately with the fulcrum-pins C C, which rocks the said lever sufficiently to fill the dropper J with seed within the hopper K at the forward part of the machine, and deposit the said seed into the furrowing-drill N beneath the frame. A pair of covering-shovels rearwardly from this drill, in connection with the beveled wheels rearwardly, assist in covering the seed, and at the same time form somewhat of a ridge over it.

When it is desired to move the machine without the dropping attachment, the lever can be raised rearwardly, so as to clear the fulcrum-pins in the revolution of the wheels, and secure it in position to the handles by means of vertical sliding pins O, and secured in position by means of the pin.

What I claim as new is—

1. In a corn and pea planter, a main frame and wheels, in combination with a rocking lever engaging intermittently with fulcrum-pins between a pair of beveled wheels, and forwardly with a dropper, so as to feed the seed into the furrowing-drill, substantially as herein set forth.

2. In a corn and pea planter, a main frame and wheels, in combination with a rocking lever hinged centrally, and connected at its forward end by means of a rod with the stem of the dropper within the seed-box, and so disposed as to feed seed into the furrowing-drill intermittently by engaging rearwardly with fulcrum-pins located between the beveled wheels, and also arranged to be thrown out of gear by means of a vertical piece and pin connecting with the handles, substantially as herein set forth.

3. The combination of the rocking lever, connecting forwardly with the dropper and rearwardly with the handles, so disposed as to engage with pins between the wheels, with the beveled wheels disposed upon the axle and connected together by means of transverse pins, substantially as herein set forth.

4. The combination of the rocking lever, hinged somewhat centrally, engaging with the wheels rearwardly, so as to produce a rocking motion, with the seed-box, the furrowing-drill, and the adjustable dropper having the lug $m$, substantially as herein set forth.

5. The combination of the furrowing-drill N, the adjustable dropper L, provided with the lug $m$, the rocking lever H, and the beveled wheels, the whole arranged as and for the purpose substantially as herein set forth and described.

In testimony that I claim the foregoing I have hereunto set my hand, this 1st day of May, 1885, in the presence of witnesses.

HENRY C. HOWELL.

Witnesses:
B. MULHOLLAND,
JAS. J. WOULF.